No. 651,654. Patented June 12, 1900.
H. F. DETERDING.
WEEDING HARROW.
(Application filed May 20, 1899.)
(No Model.) 2 Sheets—Sheet 1.
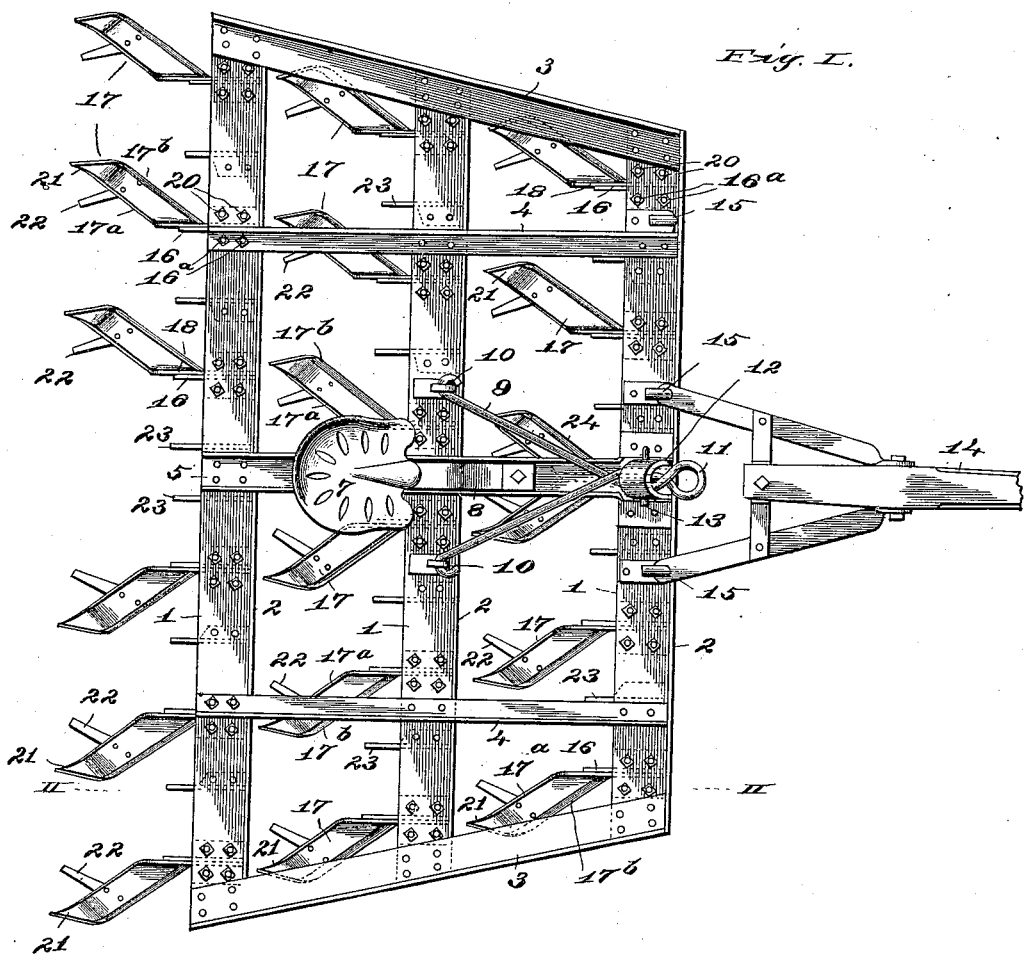
Fig. I.
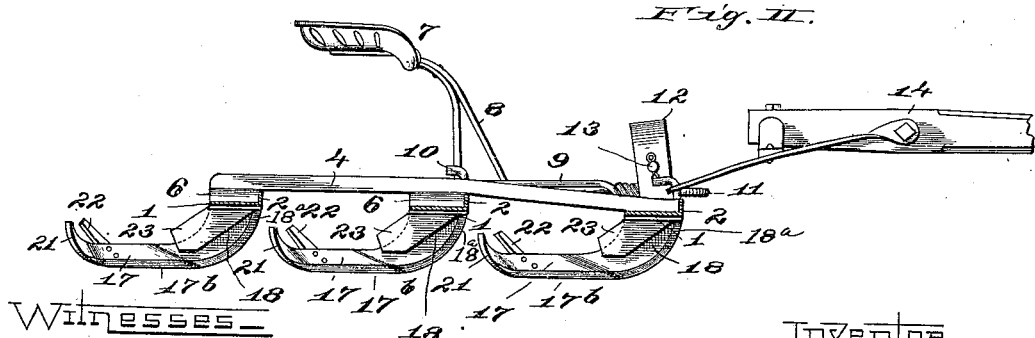
Fig. II.
Witnesses
G. A. Bauberschmidt
E. S. Knight
Inventor
Henry F. Deterding
By Knight Bro.
Attorneys
THE NORRIS PETERS CO., PHOTO-LITHO., WASHINGTON, D. C.

No. 651,654. Patented June 12, 1900.
H. F. DETERDING.
WEEDING HARROW.
(Application filed May 20, 1899.)
(No Model.)
2 Sheets—Sheet 2.
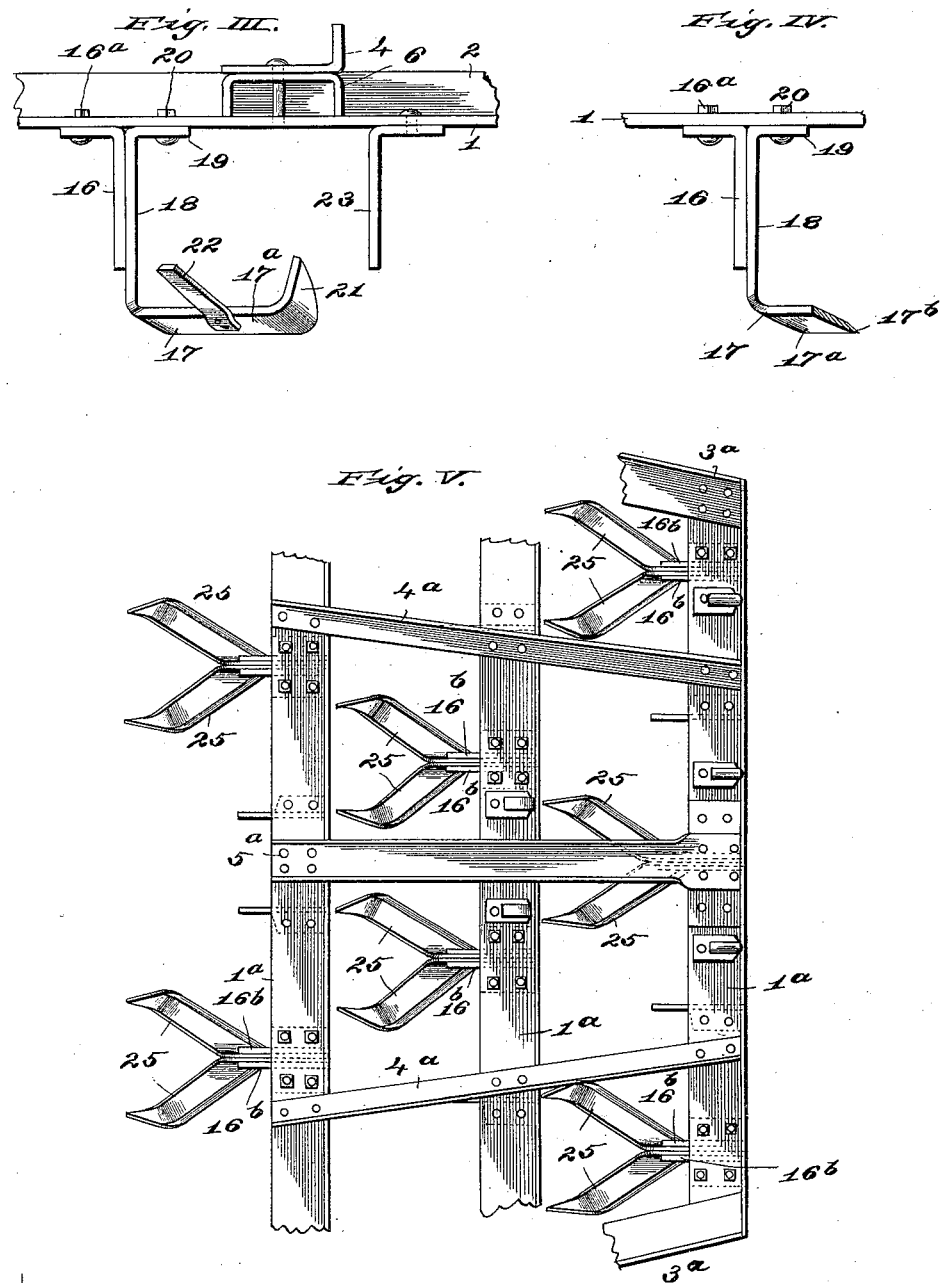

UNITED STATES PATENT OFFICE.

HENRY F. DETERDING, OF COMMERCE, MISSOURI.

WEEDING-HARROW.

SPECIFICATION forming part of Letters Patent No. 651,654, dated June 12, 1900.

Application filed May 20, 1899. Serial No. 717,536. (No model.)

*To all whom it may concern:*

Be it known that I, HENRY F. DETERDING, a citizen of the United States, residing at Commerce, in the county of Scott and State of Missouri, have invented certain new and useful Improvements in Weeding-Harrows or Perennial-Weed Exterminators, of which the following is a full, clear, and exact description, reference being had to the accompanying drawings, forming part of this specification.

My invention relates to a harrow adapted for use in exterminating perennially-growing weeds which are difficult to destroy and require repeated disturbance in order to kill them. The device is of the class shown and described in Letters Patent granted to me February 28, 1899, No. 620,429. The present improvement is distinguished from that of the patent named in that single horizontal cutting-blades are used as well as double cutting-blades, and the cutting-blades are of an improved shape, so as to accomplish the work of the blades more satisfactorily than the blades heretofore used. While the device of the patent is of great service in ordinary ground, it is subject to objectionable features in land containing trash, such as tough roots and vines that are liable at times to become caught in front of the cutters and hang over the double blades, and the loose ends of the roots or vines are liable to be pulled under and caught against the two blades to be dragged along the ground with the harrow, thereby adding to the friction in the draft of the harrow, as well as deteriorating the effective working of the implement. By using cutting-blades of the present shape the roots or vines encountered and the loose ends of such roots or vines are pulled under the blade and slipped therefrom in a slanting direction without being caught and maintained in contact with the blades.

It is a well-known fact that such weeds as trumpet-vines, devil's shoestring, and Canada and Russian thistles require stringent methods to destroy them. The only effective manner in which such weeds can be destroyed is by cutting them off repeatedly immediately beneath the surface of the ground, and thus keeping them from putting forth fresh leaves, which are the vital or essential part of every plant. It is for the purpose of so cutting the weeds immediately beneath the surface of the ground that I have devised my improved harrow, the blades of which are adapted to operate in a shearing manner and practically mow the weeds underground and throw the roots and cut ends or sprouts above the surface, where the sun may act upon them to accomplish their complete destruction. In such a device it is essential that the draft be very light, considering the quantity of work accomplished, and it is therefore essential that the cutter-blades should move in a shearing manner through the ground instead of passing therethrough broad-faced.

My invention consists in features of novelty hereinafter fully described and claimed.

Figure I is a top or plan view of my improved weed-exterminator or harrow. Fig. II is a cross-sectional view taken on the line II II, Fig. I. Fig. III is an enlarged detail view of a portion of the harrow, showing one of the cutter-blades in rear elevation. Fig. IV is an enlarged detail view of one of the cutter-blades in rear elevation and partly in section. Fig. V is a top view of a modified construction of harrow in which double blades of the form shown in Figs. I to IV, inclusive, are illustrated in lieu of the single blades.

The frame of the harrow is formed of cross-bars 1, of angle shape, the vertical flanges 2 of which extend upwardly at the forward edges of said bars. The bars 1 are joined by end angle-bars 3 and intermediate connecting-bars 4, of angle shape.

5 designates a central connecting-bar of channel shape, the forward end of which is secured directly to the forward cross-bar 1, while the connection to the rear cross-bars is made to the bars through superimposed fillers 6.

7 designates a seat, the support 8 of which is secured to the channel-bar 5 by suitable means, such as a bolt, as seen in Fig. I.

9 designates a draft-link connected to hooks 10 on the second cross-bar, the forward end of said link being formed into a loop 11, to which the doubletree may be attached. The forward end of the draft-link is confined within a shackle 12, containing a retaining-pin 13.

14 designates a tongue adapted to be connected to two hooks 15 on the front cross-bar 1, said tongues being of service in maintaining a steady or even drag of the harrow in practical use.

17 designates cutter-blades, each blade being formed with a vertical runner-shaped part 18, provided with a front cutting edge 18ᵃ and having a lateral arm 19 bent therefrom at the upper end. The arm 19 of each blade is secured to one of the cross-bars 1 by means of bolts 20 or other suitable means of attachment.

16 designates ears secured to the cross-bars 1 by bolts 16ᵃ, passing through the bent arms of said ears. The ears are secured to the vertical parts 18 of the cutter-blades by any suitable means, preferably welding, and they serve as braces or stiffeners for said blades. (See Fig. III.) Each of the cutter-blades is formed with a narrow body part 17ᵃ, extending rearwardly from the vertical part 18 in a direction oblique to the line of the cross-bars 1, by which the blade is carried, the said body part being inclined upwardly and rearwardly from its forward cutting edge 17ᵇ, which is a continuation of the front cutting edge 18ᵃ. The rear end of each cutter-blade is formed with an unsharpened upturned curved lip 21. In the use of the harrow the lips 21 cut through the soil upwardly from the main bodies of the cutter-blades, and thereby uplift and disturb any weeds contained therein.

22 designates agitator-teeth riveted to the bodies of the cutter-blades and projecting rearwardly therefrom, the said teeth being adapted to stir and loosen the soil as it passes from the blades, whereby such teeth perform an office of similar nature to that performed by the lips 21.

23 are clod-breaking prongs secured to the cross-bars 1 intermediate of the cutter-blades. Secured to the forward cross-bar at a central location is a double cutter-blade 24, the blades, lips, and prongs of each blade of which are of similar construction to the single cutter-blades 17. The cutter-blades 17 are arranged in rows or series across the harrow, the blades of each series being out of line with those of the next adjacent series, but so arranged that they overlap lines drawn from the front to the rear of the harrow, whereby all of the surface over which the harrow is drawn is effectually operated upon in practical use. The lips 21 of the cutter-blades being of curved form provides for less friction and easier draft in the use of the harrow and also better scouring than is possible where such lips are bent at a direct angle from the bodies of the cutters. The cutter-blades being arranged obliquely to the cross-bars to which they are connected, there is less resulting friction than occurs where such blades are presented broad-faced, and the cutters pass through the ground with a shearing action, which enables the most effective accomplishment of the severing of weed-roots beneath the surface of the ground as the cutters travel therethrough.

In Fig. V, I have shown a harrow in which double cutter-blades 25, similar in form to those 17, are used and in which the agitator-teeth 22 are omitted. The double blades 25 are secured to the cross-bars 1ᵃ by ears 16ᵇ, between which their vertical portions are held.

I claim as my invention—

A weeding-harrow cutter-blade formed integral with a vertical runner-shaped part having a downwardly-curved front cutting edge, with a lateral arm above the runner-shaped part, with a narrow body part inclined upwardly toward the rear and having a horizontal cutting edge, and with an upturned forwardly-curved lip at the outer end of the body; substantially as described.

HENRY F. DETERDING.

In presence of—
B. H. FINLEY,
M. W. CAMPBELL.